US 6,552,715 B2

(12) United States Patent
Murphy

(10) Patent No.: US 6,552,715 B2
(45) Date of Patent: *Apr. 22, 2003

(54) SELF CLEANING COMPUTER POINTER OR MOUSE

(75) Inventor: Stephen C. Murphy, Payette, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/911,897

(22) Filed: Jul. 23, 2001

(65) Prior Publication Data

US 2001/0040555 A1 Nov. 15, 2001

Related U.S. Application Data

(63) Continuation of application No. 09/099,762, filed on Jun. 18, 1998.

(51) Int. Cl.$^7$ ............................................... G09G 5/08
(52) U.S. Cl. ............................................... 345/163
(58) Field of Search ........................... 345/163, 164, 345/184, 167, 157, 156, 168, 176, 179

(56) References Cited

U.S. PATENT DOCUMENTS

| | | |
|---|---|---|
| 4,760,618 A | 8/1988 | Chapin, Jr. |
| 5,418,999 A | 5/1995 | Smith |
| 5,436,616 A | 7/1995 | Futatsugi et al. |
| 5,486,845 A | 1/1996 | Chait |
| 5,615,438 A | 4/1997 | Field |
| 5,617,124 A | 4/1997 | Taylor et al. |
| 5,815,140 A | 9/1998 | Kitazawa |

Primary Examiner—Richard Hjerpe
Assistant Examiner—Ronald Laneau
(74) Attorney, Agent, or Firm—Knobbe, Martens, Olson & Bear, LLP.

(57) ABSTRACT

A computer pointer is disclosed comprised of a housing having an aperture and a ball rollably mounted within the housing so that a portion of the ball is accessible through the aperture in the housing so that force can be exerted on the ball through the aperture to induce the ball to rotate within the housing. The pointer is further comprised of at least one rotating position member having an outer surface, the at least one rotating position member being mounted within the housing and frictionally engaged on a first side with the ball so that rolling motion of the ball results in corresponding rotation of the at least one rotating position member. Further, the computer pointer is comprised of a cleaning member mounted within the housing so as to be positioned adjacent a second side of the at least one rotating position member so that debris that is adhering to the outer surface of the at least one rotating position member is dislodged from the outer surface of the at least one rotating position member as the at least one rotating position member rotates in response to the rolling motion of the ball. In addition, a method of using a computer mouse is disclosed including the acts of inducing a ball within a housing to move resulting in the rotation of at least one rotating position member thereby causing a cleaning member adjacent to the at least one rotating position member to dislodge debris that is adhering to the outer surface of the at least one rotating position member.

29 Claims, 2 Drawing Sheets

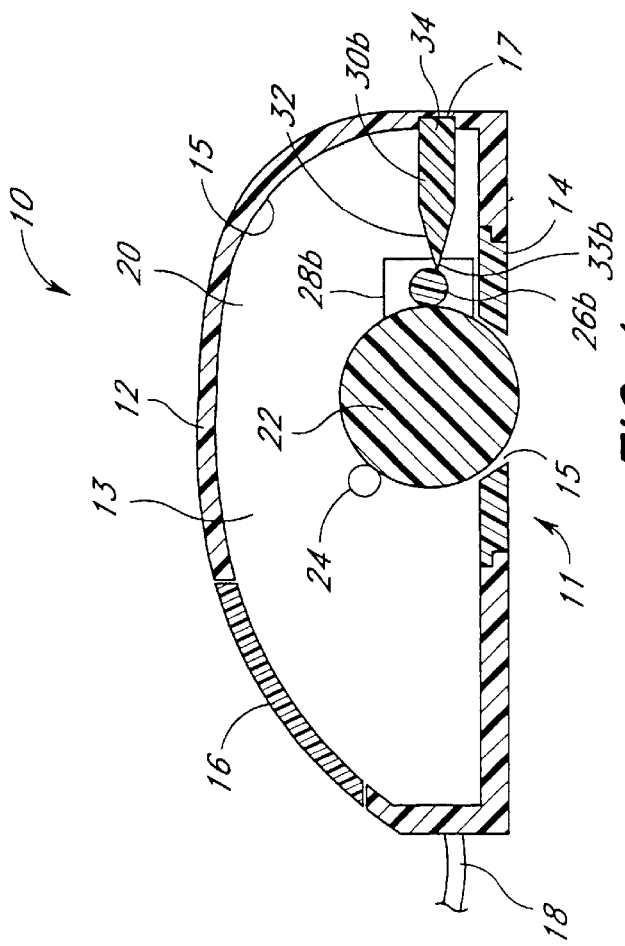
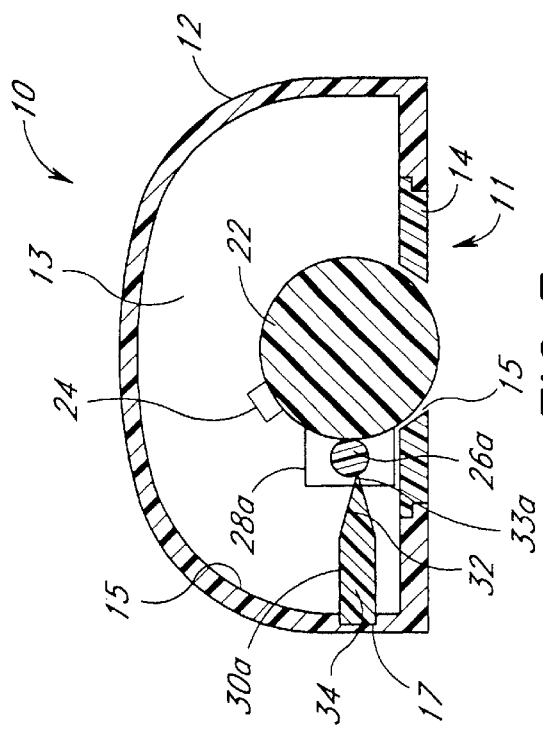

SELF CLEANING COMPUTER POINTER OR MOUSE

This application is a continuation of U.S. patent application Ser. No. 09/099,762 entitled "SELF CLEANING COMPUTER POINTER OR MOUSE" and filed on Jun. 18, 1998. The disclosures of the above-described patent application is hereby incorporated by reference in its entirety.

BACKGROUND OF THE INVENTION

1. Field of the Invention

The invention relates to computer pointer cleaning implements. More particularly, this invention relates to a computer pointer cleaner, and a method of using a mouse incorporating a computer pointer cleaner.

2. Discussion of the Related Art

It is common for computers to be operated with electromechanical pointing devices, such as a mouse. In addition to performing other functions, a mouse is used to move the position of a cursor on a computer screen. Generally, a user slides a mouse across a flat surface such as a desktop causing the cursor on the computer screen to change position.

In particular, in a typical mouse, a ball positioned within the mouse and protruding partially from the bottom surface of the mouse rotates as the mouse is moved across a surface. As the mouse is moved, the ball frictionally engages rotating position members within the mouse causing the position members to rotate. The rotational movement of the position members, in turn, cause sensors within the mouse to generate signals indicative of the rotational position of the position members. The signals are sent to the computer which uses the signals to proportionately move a cursor on the computer display to a new position.

For the mouse to operate properly, the ball and position members within the mouse housing should generally be kept clean and free of lint, dirt, oil and other debris. Otherwise, the rotational movement of the ball and the members will be impeded. However, the constant movement of the mouse across a surface causes the ball to pick up debris and foreign matter from the surface which can then be transferred onto the position members within the mouse. The accumulation of debris on the position members can eventually cause the mouse to function poorly.

To clear debris from the inner components, the mouse can be disassembled and the individual components cleaned. However, many users neglect to regularly clean the components of the mouse. In fact, many users never clean the internal components. Consequently, the accumulated debris on the ball and the position members eventually build up preventing accurate operation of the mouse. As a result, movement of the cursor on the screen will fail to properly correspond to the movement of the mouse across a surface.

To address the problems associated with the accumulation of dirt and debris within a mouse, a number of cleaning implements have been designed. For example, one cleaning implement is disclosed in U.S. Pat. No. 4,760,618 to Chapin, Jr. This patent discloses a mouse having a mouse ball that is covered in hook and loop material and the ball can be rolled over a surface of mating hook and loop material to clean the ball. As a result, debris within the mouse is picked up by the hook and loop material on the ball and is then transferred to the surface with mating hook and loop material. However, this system requires that the user disassemble the mouse, remove the ball, cover the mouse in hook-and-loop material, reassemble the mouse, and slide the mouse and sheathed ball across a special surface. Subsequently, the mouse must be disassembled again and the ball unsheathed to resume normal operation. Because of these cumbersome use requirements, users are unlikely to use this device at sufficiently regular intervals to avoid the accumulation of debris on the inner components of the mouse. Consequently, debris will accumulate within the mouse and interfere with the proper functioning of the mouse.

Other implements for cleaning a computer mouse include curved elongated brushes that can slide into the mouse housing such as is described in U.S. Pat. No. 5,418,999 to Smith. The Smith device requires that the user disassemble the mouse, remove components, manually brush out debris, and reassemble the mouse. Accordingly, individuals are also unlikely to perform these various steps on any type of a regular basis which would prevent the accumulation of debris within the mouse housing thereby eventually causing the mouse to perform poorly.

Another cleaning system, such as the system disclosed in U.S. Pat. No. 5,615,438 to Field, employs a spherical container with a tacky interior lining. In that system, a roller ball is placed in the container and moved around to enable the tacky liner to collect debris on the ball. However, this device also requires that the user disassemble the mouse, remove the ball, place the ball in a container with a tacky liner, and move the container around so that the ball within the container rolls. The tacky liner within the container removes debris from the surface of the ball thereby cleaning the ball. The user then has to reassemble the mouse. Accordingly, like the devices described above, the device disclosed in the '438 patent requires that the user perform a number of tasks in order to clean the ball. Again, many users are unlikely to regularly disassemble the mouse and clean the components. Another disadvantage of this device is that it only cleans the ball and not any of the other components of the mouse.

Another mouse cleaning device is disclosed in U.S. Pat. No. 5,486,845 to Chait. This patent discloses a device which uses a gasket formed by netting material that is attached to an absorbent pad which is positioned between the roller ball and an exterior retaining clip. As the ball rolls, the gasket net scrapes debris from the surface of the ball while the absorbent pad collects moisture, oil and the debris scraped from the ball by the net. As a result, some debris is removed from the ball. However, this device is ineffective as it requires that the user periodically replace the used absorbent pad and net with a new absorbent pad and net. Specifically, the gasket will eventually be saturated with dirt and debris limiting its effectiveness at keeping the mouse clean. If not replaced, the accumulated debris on the absorbent pad and net may eventually be transferred back to the ball and subsequently transferred to other mouse components such as rotating position members, and ultimately affecting operation of the mouse. Further, as the gasket becomes worn and its effectiveness decreases, debris will increasingly not be picked up by the gasket and will be transferred to the other mouse components such as rotating position member thereby, again, affecting proper operation of the mouse. Further, as the gasket becomes worn and its effectiveness decreases, debris will increasingly not be picked up by the gasket and will be transferred to the other mouse components where it can impair the operability of the mouse.

Hence, the prior art devices are inadequate for cleaning a computer mouse as they require too much effort on the part of the user, and they fail to consistently and reliably remove debris and other particles from the components within a mouse housing while the mouse is in use. Specifically, these devices require the user to periodically perform a number of cleaning steps to clean the mouse which many users will not do. Moreover, the prior art devices are designed to clean either the ball or the interior of the mouse housing, but fail to clear debris from the rollers within the mouse housing.

Accordingly, there remains a need for cleaning device that clears debris from the components within a mouse while the mouse is in normal use in such a manner that the cleaning apparatus is less likely to be clogged, and does not require any user intervention beyond normal use.

SUMMARY OF THE INVENTION

The aforementioned needs are satisfied by the invention which is a computer pointer comprised of a housing having an aperture and a ball rollably mounted within the housing so that a portion of the ball is accessible through the aperture in the housing, in a manner permitting force to be exerted on the ball through the aperture to induce the ball to rotate within the housing. The pointer is further comprised of at least one rotating position member having an outer surface, the at least one rotating position member being mounted within the housing and frictionally engaged on a first side with the ball so that rolling motion of the ball results in corresponding rotation of the at least one rotating position member. Further, the computer pointer is comprised of a cleaning member mounted within the housing so as to be positioned adjacent a second side of the at least one rotating position member so that debris that is adhering to the outer surface of the at least one rotating position member is dislodged from the outer surface of the at least one rotating position member as the at least one rotating position member rotates in response to the rolling motion of the ball.

In addition, a method of using a computer mouse is disclosed including the acts of inducing a ball within a housing to move in a manner that induces the rotation of at least one rotating position member and thereby causes a cleaning member adjacent to the at least one rotating position member to dislodge debris that is adhering to the outer surface of the at least one rotating position member.

The computer pointer is thus able to clean debris off of the moving parts while the pointer is being used, thus reducing the need to disassemble the pointer for cleaning. In one embodiment, the computer pointer with the cleaning member is adapted to be used as a mouse that is moved across a surface. Alternatively, the computer pointer can be configured to be a trackball type pointer where the user moves the trackball by hand. These and other objects and advantages of the invention will become more fully apparent from the following description taken in conjunction with the accompanying drawings.

BRIEF DESCRIPTION OF THE DRAWINGS

FIG. 3 is a cross-sectional view of the mouse with the position member cleaner of FIG. 2, taken along line 3—3; and FIG. 4 is a cross-sectional view of the mouse with the position member cleaner of FIG. 2, taken along line 4—4.

DETAILED DESCRIPTION OF THE INVENTION

Figure 1:
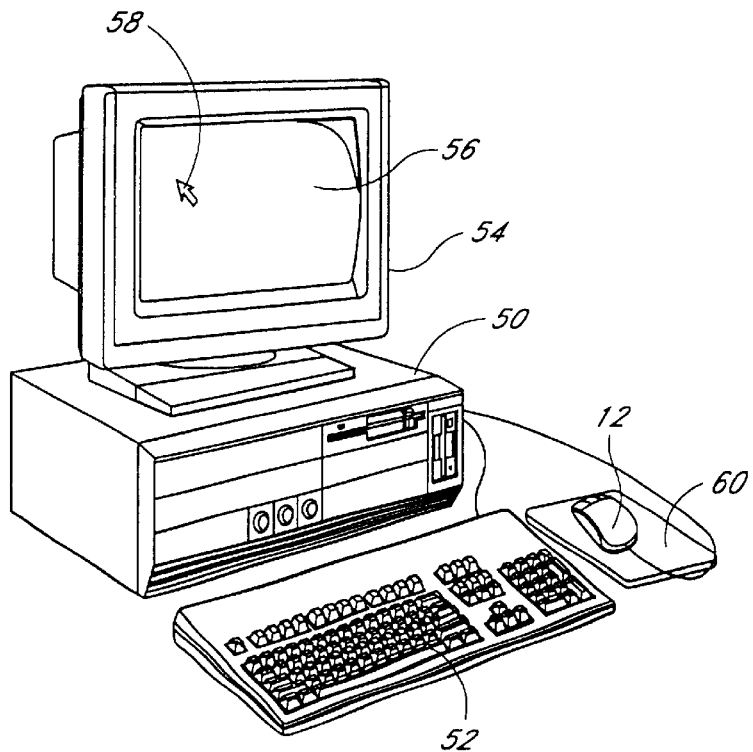
FIG. 1 is a perspective view of a computer system with a computer pointer or mouse.

Reference will now be made to the drawings wherein like numerals refer to like parts throughout. FIG. 1 illustrates a computer pointer 12 positioned on a surface 60 and used in conjunction with a computer 50, keyboard 52, and monitor 54. As will be discussed in greater detail below, the pointer 10, which is connected to the computer 50, rolls across the surface 60 and generates a signal that causes a cursor 58 on a computer screen 56 to move. When the pointer 10 moves across the surface 60, debris, including lint, oil and dirt, from the surface 60 accumulate on the internal components within the pointer 10 thereby interfering with the proper operation of the pointer 10. As will be discussed in greater detail below in reference to FIGS. 2, 3 and 4, the pointer 10 of this embodiment is adapted to clean this debris from moving surfaces within the pointer 10 to enhance the longevity of the pointer 10.

Figure 2:
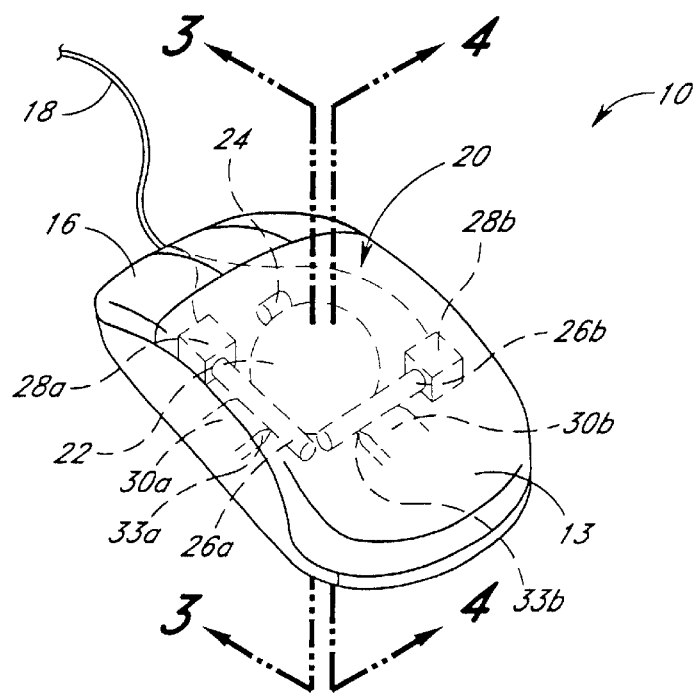
FIG. 2 is a perspective view of the mouse of FIG. 1 with one embodiment of a rotating position member cleaner of the invention shown in phantom.

FIG. 2 illustrates a pointer 10 which, in the illustrated embodiment, is comprised of a well-known mouse having a housing 12 that defines an interior cavity 13. A roller assembly 20 and cleaning members 30a, 30b are positioned within the cavity 13. The roller assembly 20, in turn, is comprised of a ball 22 positioned between and in rolling contact with two cylindrical rotating position members 26a, 26b and a biasing member 24. Sensors 28a, 28b are respectively coupled to the position members 26a, 26b so as to sense the rotational positions of the rotating position members 26a, 26b and provide position signals indicative thereof in a manner known in the art. The sensors 28a, 28b provide these position signals to the computer 50 via the cord 18 and these signals are used by the computer 50 to control the position of the cursor 58 on the screen 56 in a manner known in the art. Further, the cleaning members 30a, 30b are also positioned adjacent to the rotating position members 26a, 26b and are adapted to dislodge debris from the members 26a, 26b gathered by the ball 22 and transferred to the members 26a, 26b in the manner that will be described in greater detail below.

Specifically, FIGS. 3 and 4 are cross-sectional views of the pointer 10 and illustrate an embodiment of the rolling assembly 20 and the cleaning members 30a, 30b positioned within the housing 12. A ball 22 is positioned within the cavity 13 of the housing 12 adjacent a bottom surface 11 of the housing 12. In the illustrated embodiment, the bottom surface 11 of the housing 12 includes a removable retainer 14 having an opening 15. The retainer 14 is removable so as to provide access to the internal cavity 13 of the mouse 10. The opening 15 in the retainer 14 is sufficiently large to permit the ball 22 to extend partially therethrough and to contact the surface 60, enabling the ball 22 to roll along a surface 60 and operate the roller assembly 20 within the cavity 13.

In the illustrated embodiment, the rotating position members 26a, 26b are positioned adjacent the ball 22. A biasing member 24 is positioned generally opposite the opening 15 so as to bear against the ball 22 to urge the ball 22 into a position where the ball 22 protrudes through the opening 15 and is in frictional engagement with the rotating position members 26a, 26b. The ball 22 rotates as the housing 12 of the pointer 10 is moved over the surface 60 in a manner that is known in the art.

The rotating position members 26a, 26b are captured within the housing 12 so that at least one rotating position member rotates about an axis of rotation that is generally normal to the direction of rotational motion of the ball 22. In this embodiment, the housing has recesses 17 that receive the ends 27 of the rotating position members 26a, 26b in a manner that permits rotation of the rotating position members 26a, 26b. The frictional engagement between the rotating position members 26a, 26b and the ball 22 results in the rotation of the position members 26a, 26b being proportionate to the degree of rolling motion of the ball 22 in a direction normal to the plane of the rotating position members 26a, 26b.

As discussed above, the sensors 28a, 28b sense the rotational position of the rotating position members 26a, 26b and provide signals indicative thereof to the computer 50. Hence, by moving the housing 12 over the surface 60 so as to change the X and Y position of the pointer 10 on the surface 60, the user can send signals to the computer 50 that the computer 50 can use to adjust the corresponding X and Y position of the cursor 58 on the screen 56. The operation of the pointer 10 in this respect is substantially similar to the operation of many well known and commercially available pointers.

The cleaning members 30a, 30b are positioned within the housing 12 so as to be located immediately adjacent one side of the rotating position members 26a, 26b. In the illustrated embodiment, the cleaning members 30a, 30b are generally elongated elements each having a first end 32 and a second end 34. In the illustrated embodiment, the second end 34 is attached to the interior surface 15 of the housing 12, while the first end 32 extends outward from and in a direction normal to the interior surface 15 of the housing 12 with the tip thereof positioned adjacent the rollers 26a, 26b. As is also shown in FIGS. 3 and 4, the first ends 32 of the cleaning members 30a and 30b are preferably tapered so as to define a tip 33a and 33b which is positioned immediately adjacent the outer surface of the rotating members 26a, 26b.

In particular, as shown in FIGS. 3 and 4, the tips 33a, 33b of the cleaning members 30a, 30b are positioned so as to be immediately adjacent a side 27a, 27b of the rotating members 26a, 26b that is opposite the side of the rotating members 26a, 26b that is in contact with the ball 22. The tips 33a, 33b of the cleaning members 30a, 30b are of sufficient width to be immediately adjacent a substantial length of the rotating members 26a, 26b. In one embodiment, the width of the tips 33a, 33b of the cleaning members 30a, 30b is at least one-eighth of the length of the rotating members 26a, 26b. In another embodiment, the width of the tips 33a, 33b is at least one-fourth of the length of the rotating members 26a, 26b. The narrower the tips 33a, 33b, the less friction that will be generated by the tips 33a, 33b contacting the rotating members 26a, 26b. Moreover, as shown in FIGS. 3 and 4, the cleaning members 30a, 30b are mounted to the interior wall 15 so as to extend outward such that the tips 33a, 33b are positioned adjacent the outer circumference of the rotating members 26a, 26b at a height that is higher than the axis of rotation of the rotating members 26a, 26b.

The operation of the automatic mouse cleaners 30a, 30b will now be described with reference to FIGS. 1, 3 and 4. As illustrated in FIG. 1, the pointer 10 is moved across a surface 60 by the user. The movement of the pointer 10, results in corresponding movement of the cursor 58 on the computer screen 56. Moreover, movement of the pointer 10 across a surface 60 causes the ball 22 to rollably move in the housing. Because the biasing member 24 holds the ball 22 in frictional engagement with the rotating position members 26a, 26b, movement of the ball 22 compels the members 26a, 26b to rotate. As the members 26a, 26b rotate, the sensors 28a, 28b sense the change of position of the members 26a, 26b and send a signal to the computer 50 as to the precise movement of the members 26a, 26b. This signal, in turn, causes the cursor 58 on the computer screen 56 to move proportionately to the movement of the rotating position members 26a, 26b within the housing 12.

In addition to causing the cursor 58 on the screen 56 to move, the rotation of the members 26a, 26b, in conjunction with the cleaning members 30a, 30b, also operates to clean the members 26a, 26b. In particular, as the members 26a, 26b rotate, the cleaning members 30a, 30b scrape away and dislodge debris from the surface of the members 26a, 26b.

In one embodiment, the tips 33a, 33b of the cleaning members 30a, 30b are made of a plastic material and are positioned so as to be touching the outer surface of the rotating position members 26a, 26b. This results in the debris, adhering to the outer surface of the rotating position members 26a, 26b, being scraped away by the tips 33a, 33b of the cleaning members 30a, 30b. The use of tapered cleaning members reduces the frictional engagement between the cleaning members 30a, 30b and the rotating position members 26a, 26b thereby allowing the cleaning members 30a, 30b to clean the rotating position members 26a, 26b without unduly hindering rotation of the rotating position members 26a, 26b as a result of movement of the pointer 10 over the surface 60. Specifically, a tapered member reduces the surface area of an interface between the rotating position member 26 and the cleaning member 30 where debris could lodge and ultimately hinder operation of the device.

In another embodiment, the tips 33a, 33b of the cleaning members 30a, 30b are positioned adjacent to the outer surface of the rotating position members 26a, 26b but do not actually contact the outer surface. The tips 33a, 33b of the cleaning members 30a, 30b are positioned sufficiently close to the rotating position members 26a, 26b to dislodge accumulated debris from the outer surface of the rotating position members 26a, 26b.

In the illustrated embodiment, debris is dislodged from the rotating position members 26a, 26b and preferably falls to the bottom surface 15 of the housing 12 in a location in the housing 12 where the debris is not proximate to any rotating surfaces such as the ball 22 or the position members 26. Hence, the debris desirably falls to the bottom surface 15 of the housing 12 where it settles and is less likely to hinder proper operation of the pointer 10.

As discussed above, in the illustrated embodiment, the cleaning members 30a, 30b are located so that the tips 33a, 33b are adjacent the outer surface of the rotating position members 26a, 26b at a height that is below the height of the axis of rotation of the rotating position members 26a, 26b. This placement of the cleaning members 30a, 30b results in dislodged the debris falling directly from the rotating position members 26a, 26b to the bottom surface 15 of the housing 12. Should the cleaning members 30a, 30b be positioned adjacent the rotating position members 26a, 26b at a position above the axis of rotation of the rotating position members 26a, 26b, dislodged debris may be impeded by the cleaning members 26a, 26b from falling to the bottom surface 15 of the housing and, in turn, may result in the debris accumulating and adhering once more to the outer surface of the rotating position members 26a, 26b. Therefore, with the cleaning members 30a, 30b positioned below the axis of rotation, dislodged debris is less likely to be impeded from falling and, consequently, dislodged debris is less likely to continue to accumulate and adhere to the outer surface of the rotating position members 26a, 26b.

It will be appreciated that with the rotating position members 26a, 26b clean and free of accumulated debris, the members 26a, 26b are more sensitive to movement of the ball 22. This increased sensitivity, in turn, results in more precise corresponding movement of the cursor 58 on the computer screen 56. It will be appreciated that the dislodging of debris from the position members 26a, 26b is performed while the mouse 10 is in use. Moreover, it is not necessary for the mouse 10 to be disassembled for the rollers 26*a*, 26*b* to be cleaned. Accordingly, the illustrated cleaning members 30*a*, 30*b* automatically clean the position members 26*a*, 26*b* in a mouse 10 without the user having to disassemble the mouse 10 or perform any steps in addition to normal use of the mouse 10.

Although the foregoing description of the invention has shown, described and pointed out fundamental novel features of the invention, it will be understood that various omissions, substitutions and changes in the form of the detail of the apparatus as illustrated as well as the uses thereof, may be made by those skilled in the art without departing from the spirit of the present invention. As an example, the illustrated embodiment of the invention has described the invention in connection with a mouse that is maneuvered over a surface by a user. It will be appreciated, however, that the invention can also be implemented on a trackball-type pointer where a ball is captured within a cavity and is rotated by the user so as to move a cursor over a surface. Moreover, the illustrated embodiment also defines the cleaning members as being engaged with the rotational position members, however, a person of ordinary skill in the art can appreciate that the rotational position members can be engaged with any rotating surface that has debris adhering to it as a result of use of the pointer, without departing from the spirit of the invention. Consequently, the scope of the invention is not limited to the foregoing discussion, but is defined by the claims.

What is claimed is:

1. A computer pointer comprising:
   a housing having an aperture;
   a ball rollably mounted within the housing and configured such that a portion of the ball extends through the aperture so that force created external to the housing can be exerted on the ball through the aperture to induce the ball to rotate within the housing;
   at least one rotating position member having an outer surface, the at least one rotating position member being mounted within the housing and engaged on a first side with the ball so that rolling motion of the ball results in corresponding rotation of the at least one rotating position member; and
   a cleaning member mounted within the housing so as to be positioned adjacent a second side of the at least one rotating position member so that debris that is adhering to the outer surface of the at least one rotating position member is dislodged from the outer surface of the at least one rotating position member by the cleaning member as the at least one rotating position member rotates in response to the rolling motion of the ball.

2. The pointer of claim 1, wherein the housing is adapted to be moved over a surface so that movement of the housing over the surface results in the ball rolling within the housing.

3. The pointer of claim 1, wherein the at least one rotating position member is comprised of two rotating position members that are mounted so that the axes of rotation of the two rotating position members are orthogonal to each other.

4. The pointer of claim 1, wherein the cleaning member is a unitary element.

5. The pointer of claim 1, wherein the cleaning member comprises a flexible tapered member that is mounted to the housing so as to extend towards the at least one rotating position member in a cantilevered fashion and wherein the tapered member has a pointed end that is in physical contact with the outer surface of the at least one rotating position member.

6. The pointer of claim 1, wherein the cleaning member comprises a flexible tapered member that is mounted to the housing so as to extend towards the at least one rotating position member in a cantilevered fashion, and wherein the tapered member has a pointed end that is spaced-apart from the outer surface of the at least one rotating position member.

7. The pointer of claim 1, wherein the cleaning member comprises a flexible tapered member that is mounted to the housing so as to extend towards the at least one rotating position member in a cantilevered fashion, and wherein the tapered member makes contact with the at least one rotating position member at a location that is below the axis of rotation of the at least one rotating position member.

8. A position indicating device comprising:
   a housing defining a cavity and having an opening in a first surface;
   a roller ball positioned within the cavity so that at least a portion of the roller ball extends through the opening of the first surface so that the roller ball is rollably movable with respect to the housing;
   at least one rotating position member that is rotatably engaged on a first side with the roller ball so as to rotate in response to rolling movement of the roller ball over the surface of the rotating position member;
   a sensor connected to the at least one rotating position member that senses the rotational position of the at least one rotating position member and provides a signal indicative thereof;
   a cleaning member that is positioned within the housing so as to be positioned adjacent a second side of the at least one rotating position member wherein the cleaning member is positioned so that foreign matter that is picked up by the roller ball and transferred to the at least one rotating member as a result of rolling movement of the ball over the surface is dislodged from the rotating position member by the cleaning member as the at least one rotating position member rotates.

9. The position indicator of claim 8, wherein the at least one rotating position member is comprised of two rotating position members that are mounted so that the axes of rotation of the two rotating position members are orthogonal to each other.

10. The position indicator of claim 8, wherein the cleaning member is a unitary element.

11. The position indicator of claim 8, wherein the cleaning member is comprised of a flexible tapered member that is mounted to the housing so as to extend towards the at least one rotating position member in a cantilevered fashion, and wherein the tapered member has a pointed end that is spaced-apart from the outer surface of the at least one rotating position member.

12. The position indicator of claim 8, wherein the cleaning member is comprised of a flexible tapered member that is mounted to the housing so as to extend towards the at least one rotating position member in a cantilevered fashion, and wherein the tapered member has a pointed end that is in physical contact with the outer surface of the at least one rotating position member.

13. The position indicator of claim 8, wherein the cleaning member is comprised of a flexible tapered member that is mounted to the housing so as to extend towards the at least one rotating position member in a cantilevered fashion, and wherein the tapered member makes contact with the at least one rotating position member at a location that is below the axis of rotation of the at least one rotating position member.

14. A computer pointer comprising:

a housing having an aperture;

a ball rollably mounted within the housing and dimensioned such that a portion of the ball extends through the aperture so that force created external to the housing can be exerted on the ball through the aperture to induce the ball to rotate within the housing;

two rotating position members having outer surfaces, the two rotating position members being mounted within the housing and frictionally engaged on first sides with the ball so that rolling motion of the ball results in corresponding rotation of the two rotating position members, the two rotating position members mounted so that the axes of rotation of the two rotating position members are orthogonal to each other;

two cleaning members mounted within the housing so as to be respectively positioned adjacent second sides of the two rotating position members so that debris that is adhering to the outer surfaces of the two rotating position members is dislodged from the outer surfaces of the two rotating position members as the two rotating position members rotate in response to the rolling motion of the ball.

15. The pointer of claim 14, wherein the housing is adapted to be moved over a surface so that movement of the housing over the surface results in the ball rolling within the housing.

16. The pointer of claim 14, wherein the cleaning member is a unitary element.

17. The pointer of claim 14, wherein the two cleaning members are comprised of flexible tapered members that are mounted to the housing so as to extend towards the two rotating position members in a cantilevered fashion.

18. The pointer of claim 14 wherein the two cleaning members are comprised of flexible tapered members that are mounted to the housing so as to extend towards the two rotating position members in a cantilevered fashion, and wherein the tapered members have pointed ends that are in physical contact with the outer surfaces of the two rotating position members.

19. The pointer of claim 18, wherein the tapered members have pointed ends that are spaced-apart from the outer surfaces of the two rotating position members.

20. The pointer of claim 14, wherein the two cleaning members are comprised of flexible tapered members that are mounted to the housing so as to extend towards the two rotating position members in a cantilevered fashion, and wherein the tapered members make contact with the two rotating position members at locations that are below the axis of rotation of the two rotating position members.

21. A computer pointer comprising:

a first rotational member configured to contact a surface and define positional information in response to rotational movement of said first member on said surface;

second member in communication with the first member so as to obtain positional information therefrom; and a cleaning member positioned adjacent a portion of the second member and configured to contact and dislodge debris located on a surface of the second member in response to movement of said at least one of said second member.

22. The pointer of claim 21, wherein said second member rotates in response to rotational movement of said first member so as to obtain positional information therefrom.

23. The pointer of claim 21, wherein said cleaning member is a flexible element.

24. The pointer of claim 21, wherein said cleaning member is positioned adjacent to said second member only.

25. The pointer of claim 21, wherein said cleaning member is made of a plastic material.

26. A method of using a computer pointer including the acts of:

inducing a ball within a housing to move;

transferring rotation energy from the ball to at least one rotating position member connected to the ball;

contacting debris adhering to an outer surface of the at least one rotating position member with a cleaning member positioned adjacent to the at least one rotating position member, such that the cleaning member dislodges debris that is adhering to the outer surface; and sensing the position of the rotating position members so as to control the position of a cursor on a computer screen.

27. A method according to claim 26, wherein the act of transferring rotation energy comprises the act of transferring rotation energy to two rotating position members that are mounted within the housing so that the axes of rotation of the two rotating position members are orthogonal to each other.

28. A method according to claim 26, wherein the act of inducing a ball to move comprises the act of inducing a housing, having an aperture therein which is adapted to receive a portion of the ball therethrough, to move such that movement of the housing on a surface causes the ball to rotate within the housing.

29. A method according to claim 26, wherein the act of inducing a ball within a housing to move comprises the act of urging the ball into a first orientation in order to cause the ball to frictionally engage the at least one rotating position member.

* * * * *